Figure 1:
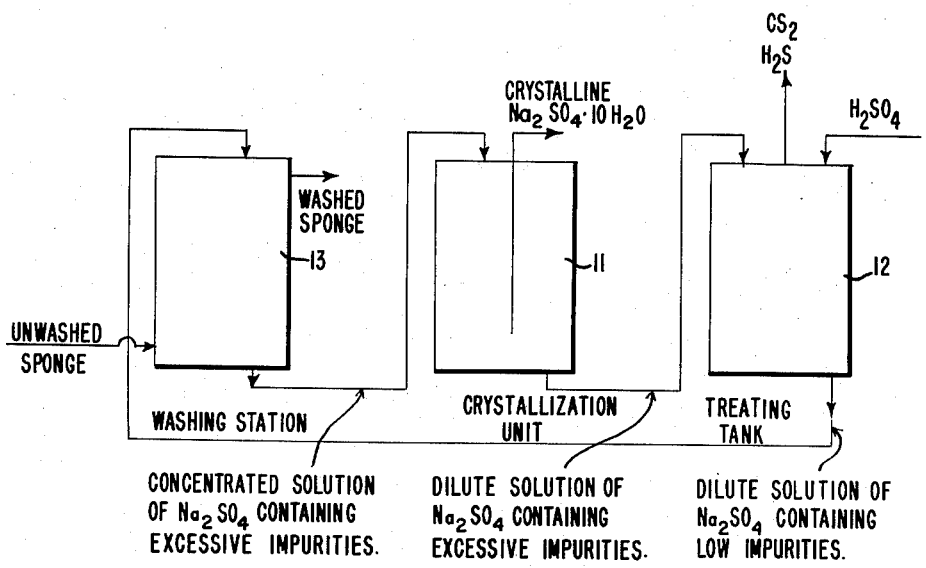

Feb. 7, 1961  G. M. JAMES  2,970,890
METHOD OF PURIFYING DILUTE SODIUM SULFATE SOLUTION
Filed Aug. 23, 1957

INVENTOR
GEORGE MARTIN JAMES

BY
ATTORNEY

United States Patent Office 2,970,890
Patented Feb. 7, 1961

2,970,890

METHOD OF PURIFYING DILUTE SODIUM SULFATE SOLUTION

George Martin James, Columbia, Tenn., assignor to E. I. du Pont de Nemours and Company, Wilmington, Del., a corporation of Delaware Filed Aug. 23, 1957, Ser. No. 679,974

2 Claims. (Cl. 23—121)

This invention relates to the manufacture of regenerated cellulose sponges and particularly, to the recovery and re-use of Glauber's salt in the purification of the sponges.

In the manufacture of regenerated cellulose sponges, an alkaline cellulose solution such as viscose and a pore-forming material such as the decahydrate of sodium sulfate (Glauber's salt) are mixed together with some fibrous material to form a paste. The paste is then introduced into molds wherein coagulation and decomposition of the cellulose xanthogenate to form cellulose hydrate and simultaneous removal of the sodium sulfate are accomplished in a manner well known to those in the art. The shaped articles are then separated from the salts and other impurities by washing.

In the first washing step, the sodium sulfate, which still remains in the product after the coagulation and regeneration steps, is removed. The sodium sulfate could be washed out with water. However, it is preferred to use a dilute sodium sulfate solution. Washing out this residual salt with water would result in the production of large quantities of very dilute sodium sulfate solutions. Recovering the valuable salt therefrom would be extremely difficult and uneconomical. Using a dilute sodium sulfate solution in this first washing step results in a relatively concentrated solution of Glauber's salt. From this solution it is economical to crystallize Glauber's salt by known methods, such as shown in U.S. Patent 2,190,280.

The products resulting from crystallization are crystals of Glauber's salt and a dilute solution of sodium sulfate. To provide optimum efficiency and greatest economy, it would be desirable to use the dilute solution of sodium sulfate from the crystallization step in the washing step. Heretofore, however, the cellulose sponge industry has been unable to utilize this solution as a wash. Besides containing sodium sulfate, this solution also contains a high concentration of sulfur impurities in the form of sodium trithiocarbonate and combined sodium sulfides and sodium polysulfides. Subsequent treatments of the sponge, particularly an acid washing step which is used to insure the completion of regeneration, tends to decompose these sulfur-containing products and deposit free sulfur on the sponge.

An object of the present invention is a process for the recovery and regeneration of the spent sodium sulfate liquid from the crystallization process to make it useful as a washing liquid in the treatment of cellulose sponges. Other objects will appear hereinafter.

The objects are accomplished by a process comprising the steps of treating the spent sodium sulfate liquid from the crystallization of sodium sulfate which is at a pH of approximately 12 and which contains at least 1.5% sodium thiocarbonate, at least 0.1% combined sodium sulfides and sodium polysulfides, and at least 2% alkali calculated as sodium hydroxide, preferably with sulfuric acid, to reduce the pH of the sodium sulfate liquid to 7.0–8.0; and aerating, preferably at an elevated temperature, the treated solution for a time sufficient to reduce the concentration of impurities to at most 1.0% sodium thiocarbonate, at most 0.07% combined sodium sulfides and sodium polysulfides, and at most 1.3% alkali calculated as sodium hydroxide.

In this specification, all percentages are by weight unless otherwise specified. By "combined sodium sulfides and sodium polysulfides" is meant to include sodium sulfide ($Na_2S$), sodium hydrosulfide (NaSH), sodium persulfides ($Na_2S_2$, $Na_2S_3$, $Na_2S_4$, $Na_2S_5$), and certain complexes such as $Na_2S_3.3S$.

Unexpectedly, any deviation from the limits of pH prescribed in this specification converts a surprisingly successful operation into failure. Thus, if the pH is permitted to remain above 8.0, the sodium thiocarbonate, the combined sodium sulfides and sodium polysulfides remain in the solution substantially unchanged. If the pH falls below 7.0 as it would if an excessive amount of sulfuric acid were added, colloidal sulfur precipitates in the solution and must be removed by an expensive filtration step. If allowed to remain in the solution, the colloidal sulfur would contaminate the sponges making them unfit for public sale.

The invention will be more clearly understood by referring to the descriptive material that follows when read in conjunction with the drawing, in which Figure 1 is a schematic flow sheet of the recovery of spent sodium sulfate liquid in accordance with the process of the present invention.

In the figure, spent sodium sulfate liquid from the crystallization unit 11, a vacuum crystallizer as described in U.S. Patent 2,190,280, is led into tank 12 at a rate of 8 gallons per minute. The liquid may contain from 1.5% to 2.5% sodium trithiocarbonate, from 0.1% to 0.5% combined sodium sulfides and sodium polysulfides, from 2.0% to 3.0% alkalinity calculated as sodium hydroxide, and from 8% to 12% sodium sulfate. The liquid is usually at a pH of about 12.

Sulfuric acid (66° Baumé or 96%) is also added to tank 12 at a rate of 0.1 gallon per minute; in other words, 1 unit of sulfuric acid per 80 units of spent sodium sulfate liquid. By means of a steam jacket, not shown, super-heated steam may be used to heat the acid-treated liquid in tank 12 to a temperature of 110°–120° F. The tank is designed so that the treated liquid remains in the tank for at least about 15 minutes and means are provided to expel the evolved carbon disulfide and hydrogen sulfide gases to the atmosphere. If desired, of course, these gases may be recovered.

The resulting liquid effluent containing about 0.5% sodium trithiocarbonate, about 0.03% combined sodium sulfides and sodium polysulfides, 0.5% alkalinity calculated as sodium hydroxide and 10–14% sodium sulfate, is led into tank 13 wherein the liquid provides the first washing solution. The solution leaves tank 13 after contacting the newly regenerated cellulose sponge at the rate of about 14 gallons per minute and contains 29% sodium sulfate, 1.8% sodium trithiocarbonate, 0.2% combined sodium sulfides and sodium polysulfides and is at a pH of 11. It is fed into the crystallization tank 11, after which the cycle is repeated. If desired, the effluent from tank 12 may be used to heat the liquid entering tank 12 (the effluent from tank 11) by sending both liquids countercurrently through a heat-exchanger as known to those skilled in the art.

Having fully disclosed the invention, it is understood that the invention is not to be limited except as defined in the appended claims.

What is claimed is:

1. In a process for purifying dilute sodium sulfate liquid containing sodium trithiocarbonate, combined sodium sulfides and sodium polysulfides as impurities, the improvement which comprises the steps of treating said dilute sodium sulfate liquid with sulfuric acid to reduce the pH of said sodium sulfate liquid to 7.0–8.0, and aerating said treated liquid for a time sufficient to reduce the concentration of sodium trithiocarbonate to at most 1.0%, the combined sodium sulfides and sodium polysulfides to at most 0.07% and the alkalinity of the liquid to at most 1.3% calculated as sodium hydroxide.

2. A process as in claim 1 wherein the treated liquid at a pH of 7.0–8.0 is heated to a temperature of 110°–120° F. during aeration.

References Cited in the file of this patent

UNITED STATES PATENTS

| | | |
|---|---|---|
| 1,924,861 | Judson | Aug. 29, 1933 |
| 2,035,981 | Richter | Mar. 31, 1936 |
| 2,237,844 | Ridgeway | Apr. 8, 1941 |
| 2,364,407 | Walker | Dec. 5, 1944 |
| 2,394,470 | O'Shaughnessy | Feb. 5, 1946 |
| 2,668,130 | Martin | Feb. 2, 1954 |
| 2,698,625 | Bitzer | Jan. 4, 1955 |
| 2,758,910 | Dudley | Aug. 14, 1956 |
| 2,856,267 | Kamlet | Oct. 14, 1958 |